Dec. 14, 1954

C. P. SPAULDING

SWEEP CIRCUIT

Filed Feb. 20, 1946

2,697,168

INVENTOR
CARL P. SPAULDING
BY M. A. Hayes
ATTORNEY

United States Patent Office 2,697,168

Patented Dec. 14, 1954

2,697,168

SWEEP CIRCUIT

Carl P. Spaulding, Pasadena, Calif., assignor, by mesne assignments, to the United States of America as represented by the Secretary of the Navy Application February 20, 1946, Serial No. 649,092

4 Claims. (Cl. 250—27)

This invention relates to wave shaping apparatus, and more specifically to such apparatus for generating a voltage V instantaneously related to time $t$ by the expression $$V=\frac{t}{1+t}$$

The need for such a voltage wave is found in certain radar applications, which form no part of the present invention and will not be discussed here.

An object of the present invention is to provide apparatus for generating a voltage wave of predetermined shape.

A more specific object is to provide apparatus for generating a voltage sweep V related to time $t$ by the expression $$V=\frac{t}{1+t}$$

A further object is to provide voltage sweep generating apparatus having operational stability.

Figure 1:
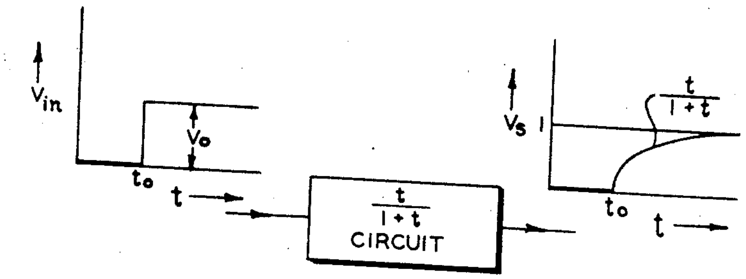
Figure 2:
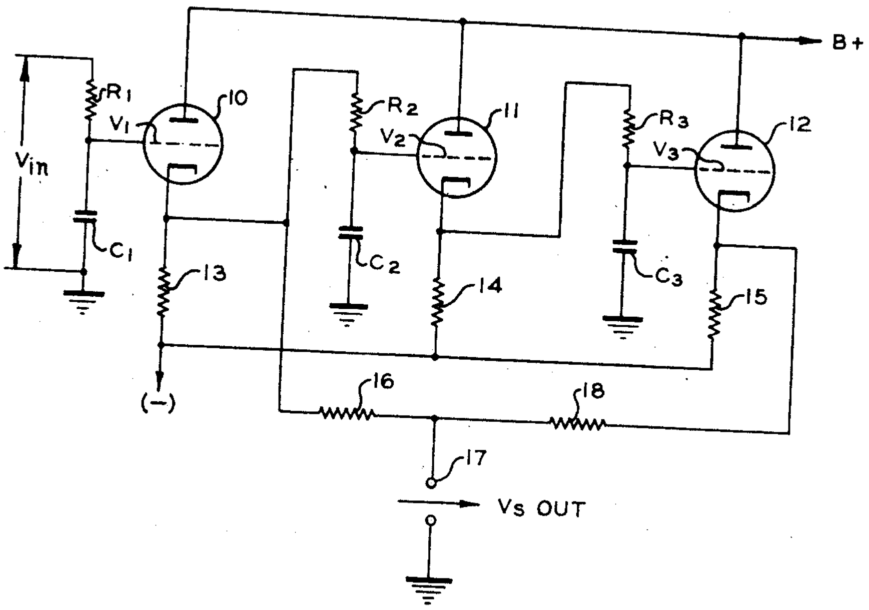

The apparatus of the present invention is fully described in the following specification and is illustrated in the accompanying drawing of which:

Fig. 1 is a diagram showing the input and output voltage waves associated with the apparatus of the present invention; and Fig. 2 is a circuit diagram showing one form of the present invention.

Referring to the figures and more specifically to Fig. 1, applied at the input of the wave forming apparatus is a voltage $V_{in}$ comprising a square step of amplitude $V_0$ occurring at a time $t_0$. At the output of the apparatus of the present invention, a voltage wave $V_s$ appears having a shape given by the equation $$V_s=\frac{t}{1+t}$$

It will be noted that the waveform of the output voltage appears very much like a transient exponential of the form $(1-e^{-kt})$ and it is upon this similarity that the present invention is based.

Fig. 2 shows a specific form of apparatus of the present invention having three cathode follower isolating stages 10, 11, and 12 whose plates are tied directly to a common positive B+ potential, and whose cathodes are led to a common negative potential through equal resistors 13, 14, and 15 respectively. The grid of each of the three cathode followers is connected across the condenser of a series RC network, and as a result, a grid receives a voltage wave which is essentially the integral of the voltage impressed across the associated RC network. Furthermore, the output of the cathode follower 10 is impressed across the RC network of follower 11, and similarly with cathode followers 11 and 12. The three stages are thus substantially in cascade, and three successive integrations are performed on the original input signal.

To produce the output $$\frac{t}{1+t}$$

voltage of Fig. 1, a voltage wave roughly similar to the one desired is generated in a first RC series network comprising resistor $R_1$ and capacitance $C_1$. With the step voltage $V_{in}$ placed across this network, an exponentially rising voltage $V_1$ appears at the grid of the first cathode follower isolating stage 10. This wave also appears at the cathode of stage 10 slightly reduced in amplitude, and is coupled through resistor 16 to output terminal 17. As stated above, a pure rising exponential wave only roughly approximates the desired $$\frac{t}{1+t}$$

sweep. To improve this approximation, the two subsequent RC integerating networks are employed, and are connected effectively in cascade with one another by cathode followers 11 and 12. The output of the cathode follower 12 is connected through resistor 18 to output terminal 17, and the accuracy of the correction introduced thereby is determined by the adjustment of the time constants of the integrating networks. Accuracy of the $$\frac{t}{1+t}$$

sweep can be further increased by the use of more than three integrating networks.

The principle of operation of apparatus of the present invention, as illustrated by the circuit of Fig. 2, can best be analyzed mathematically. The series expansion obtained by simple division of the equation for the desired output waveform appearing at terminal 17 is (1)

$$V=\frac{t}{1+t}=t-t^2+t^3-t^4+t^5\ \ldots$$

By placing the input voltage of Fig. 1 across the first RC network shown in Fig. 2, a voltage is generated across the capacitor $C_1$ which is given by the expression (2)

$$V_1=V_0(1-e^{-k_1t})=V_0\left[k_1t-\frac{1}{2!}(k_1t)^2+\frac{1}{3!}(k_1t)^3-\frac{1}{4!}(k_1t)^4\ \ldots\right]$$

where $k_1$ is the reciprocal of the time constant $R_1C_1$ of the first RC network. It will be noted that the expression for voltage $V_1$ contains all of the $t$ terms in Equation 1 for voltage V and that these terms are all of the proper sign. However, for the curve of voltage wave $V_1$ to be the same as that of voltage V, the coefficient of the $t$ terms of the $V_1$ expression must be equal. It is not possible for this condition to be brought about by the choice of any particular value of $k_1$, and as a result, correction factors must be introduced to the expression for $V_1$.

Consider now the expression for the voltage $V_2$ appearing at the grid of tube 11:

(3)

$$V_2=GV_0\left[k_1k_2t^2-\frac{1}{2!}(k_1k_2^2+k_1^2k_2)t^3+\frac{1}{2!2!}k_1^2k_2^2t^4+\frac{1}{3!}(k_1k_2^3+k_1^3k_2)t^4\ \ldots\right]$$

where G is equal to the gain of a stage. For the voltage $V_3$ at the grid of tube 12, (4)

$$V_3=G^2V_0\left[k_1k_2k_3t^3-\frac{1}{2!}(k_1k_2k_3^2+k_1k_2^2k_3+k_1^2k_2k_3)t^4\ \ldots\right]$$

Expressions 3 and 4 are obtained from an extension of the previous mathematical analysis.

The output resistors 16 and 18 are equal in magnitude, and the output circuit of Fig. 2 is an averaging network. Thus the sweep voltage $V_s$ is represented by the expression (5)

$$V_s=\frac{G}{2}(V_1+V_3)$$

By making the indicated substitutions, the final equation for $V_s$ is reached.

(6)

$$V_s=\frac{GV_0}{2}\left\{k_1t-\frac{1}{2!}k_1^2t^2+\left[\frac{k_1^3}{3!}+G^2k_1k_2k_3\right]t^3-\left[\frac{k_1}{4!}+\frac{G^2}{2!}(k_1k_2k_3^2+k_1k_2^2k_3+k_1^2k_2k_3)\right]t^4\ \ldots\right\}$$

In this expression for output voltage $V_s$, it is possible to make the coefficients of the first few $t$ terms equal by discriminate choice of $k_1$, $k_2$, and $k_3$ where $$k_1=\frac{1}{R_1C_1},\ k_2=\frac{1}{R_2C_2},\ \text{and}\ k_3=\frac{1}{R_3C_3}$$

From inspection it can be seen that the coefficients of the $t$ and $t^2$ terms are equal for $k_1=2T$, where T is some chosen unit of time. The required values of $k_2$ and $k_3$ are found by equating the coefficients of the $t^3$ and $t^4$ terms to 2T. Assuming that the gain of a cathode follower stage $G$=.98, $k_2$ is found to equal .19T, and $k_3$, 1.83T. With the circuit of Fig. 2 adjusted to have the constants given above, the output sweep voltage $V_s$ is most accurate for small values of $t$, and if the allowable deviation between the actual output voltage and the desired sweep is .1 percent, the maximum permissible value of $t$ is .32T. As is typical for all series, the accuracy of the sweep voltage $V_s$ can be improved by the addition of more terms, and this is done electrically by adding subsequent integrating networks to the circuit of Fig. 2.

Because of the simplicity of the circuit of Fig. 2, the output sweep voltage can be made very accurate, and the dependence of the output voltage on tube properties is made very small by the use of coupling stages having less than unity gain. Because of the high input impedance of the cathode followers, the RC integrating networks are not loaded. Gated clamping tubes can be placed across the capacitors in these networks to allow their rapid discharge if it is desired to operate the circuit of the present invention at a rapid rate.

The invention described in the foregoing specification need not be limited to the details shown, which are considered to be illustrative of only one form the invention may take. What I desire to secure by Letters Patent and claim is:

1. Apparatus for generating a voltage wave V having the form of the voltage-time relation $$V=\frac{t}{1+t}$$

comprising a first input network, said first network including a first resistor and a first capacitor in series, said first capacitor being connected to the input grid of a first cathode follower stage, a second network being connected to the cathode of said first cathode follower, said second network being substantially similar to said first network and having a capacitor associated with a second cathode follower stage, a third network similar to said first and second networks associated with the cathode of said second cathode follower, a third cathode follower associated with the capacitor of said third network, the plates of said three cathode followers being connected to a common positive potential, the cathodes thereof being connected through resistors to a common negative potential, the cathodes of said first and said third cathode followers being connected through large and equal resistors to a single output terminal, means for applying a step voltage across said first network and means for deriving a voltage wave at said output terminal substantially as expressed by said voltage-time relation.

2. Apparatus as described in claim 1 wherein the reciprocal of the time constant of said first network substantially equals 2T, the reciprocal of the time constant of said second network substantially equals .19T, and the reciprocal of the time constant of said third network substantially equals 1.83T, T being a chosen unit interval of time and the voltage gain of each of said first, second, and third amplifiers being substantially equal to .98.

3. Apparatus for converting a square wave into another wave of predetermined shape comprising, the combination with a plurality of cathode followers of a similar plurality of integrating networks of resistors and capacitors, the output of each cathode follower being impressed across both the resistor and the capacitor of one of said integrating networks, the input to each of said cathode followers being taken from the junction of said resistor and said capacitor of a preceding one of said integrating networks.

4. Apparatus for converting a square wave into another wave of predetermined shape comprising, a series of cathode followers in cascade arrangement, and coupling networks between each of said cathode followers, said coupling networks comprising integrating circuits, the integrated output of each of said networks being applied to the input of the succeeding cathode follower.

References Cited in the file of this patent

UNITED STATES PATENTS

| Number | Name | Date |
|---|---|---|
| 1,315,539 | Carson | Sept. 9, 1919 |
| 2,462,897 | Rector | Mar. 1, 1949 |
| 2,506,329 | Ames | May 2, 1950 |